INVENTORS.
HOWARD PRICE
BELA SZILAGYI
BY SPARROW AND SPARROW
ATTORNEYS

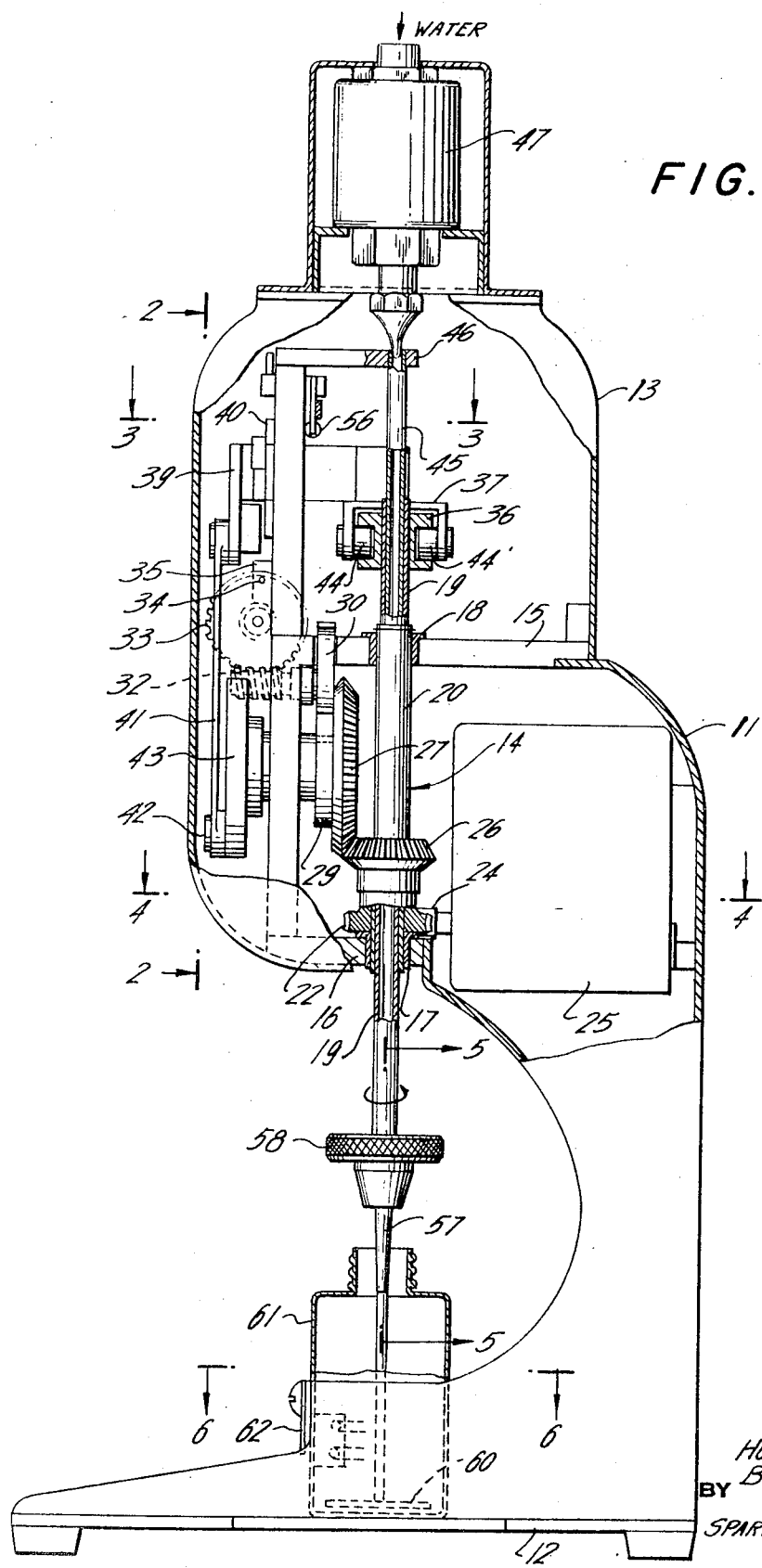

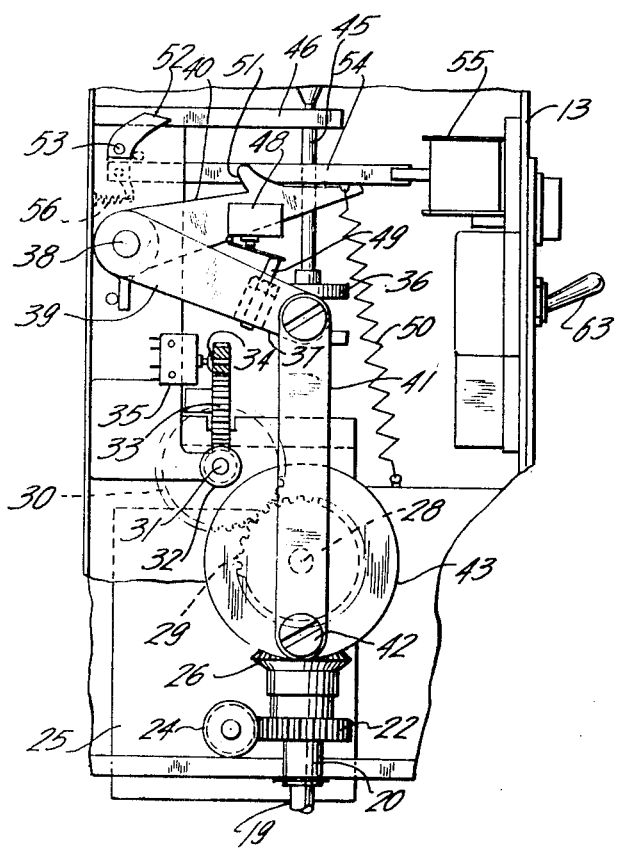

INVENTORS.
HOWARD PRICE
BY BELA SZILAGYI

SPARROW AND SPARROW
ATTORNEYS

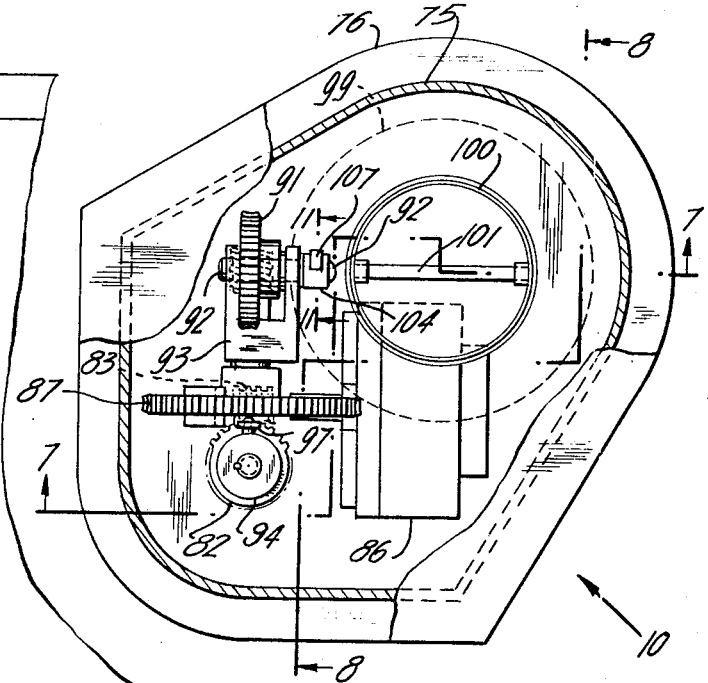
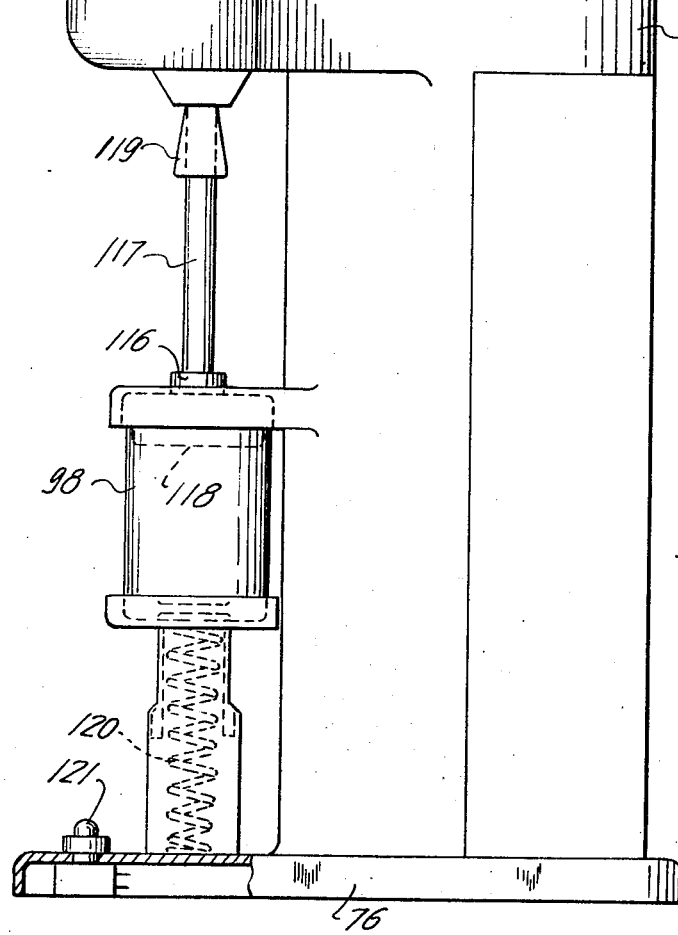
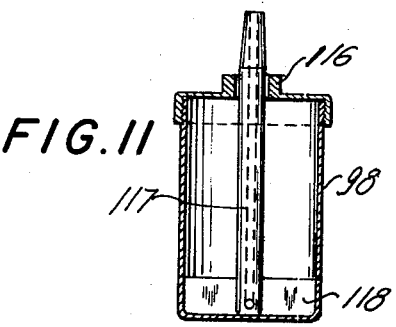

United States Patent Office 3,514,080
Patented May 26, 1970

3,514,080
ROTARY AND RECIPROCATING MIXER
Howard Price, Kings Point, and Bela Szilagyi, Flushing, N.Y., assignors, by direct and mesne assignments, to International Patents & Development Corporation, a corporation of Delaware
Filed Aug. 16, 1968, Ser. No. 753,181
Int. Cl. B01f 7/00
U.S. Cl. 259—19   15 Claims

ABSTRACT OF THE DISCLOSURE

Mixing devices for preparing mixtures or blends of powderized material with liquids in a container. A mixing propeler is rotated while it is reciprocatingly moved up and down in the container. The liquid is admitted through the hollow shaft of the propeller; the flow of the liquid is controlled by a valve or pump which is controlled by a timing device operated by the drive mechanism of the mixer.

BACKGROUND OF THE INVENTION

The invention relates to motor-driven stirring and mixing devices for solids and liquids, particularly for producing blends with consistencies ranging from creamy to pasty thickness.

Mixers for stirring powderized solids into liquids and vice-versa are known for various purposes. These mixers usually have a stationary rotating shaft; that is, the shaft is not vertically movable. Most of the known mixers do not have facilities for introducing gradually the liquid into the powdered or ground material while the mixing propeller is rotating, and no mixers are known which have built-in timing devices by which the admission of the liquid is stopped in timed relationship to the mixing cycle of the machine. Mixing certain preparations, for example, in dental labratories, cannot be performed by known devices with the quantitative and qualitative precision which is required for repetitive work. The device of this invention is contrived for solving these problems.

SUMMARY OF THE INVENTION

The invention consists in such novel features, construction arrangements, combinations of parts and improvements as may be shown and described in connection with the apparatuses herein disclosed by way of examples only and as illustrative of preferred embodiments. Mixing or blending two or more ingredients of various states, preferably of the solid or powdered and the liquid state, requires obviously precisely measured quantities for obtaining a certain end product and further requires performance of the mixing operation in a suitable manner comprising the gradual admission of the liquid during the running cycle of the apparatus and the duration of the time period of the operating cycle which requirements are accomplished by the invention. The invention considers also the automatic stopping of both the admission of the liquid and the mechanical operation after the cycle has been terminated. Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide new and improved contrivances for mixing and blending powdered or pulverulent materials with liquids for obtaining creamy or pasty products of homogeneous consistency.

Furthermore, it is an object of the invention to provide an apparatus for mixing and blending substances, in which a stirring member is rotated and at the same time vertically moved up and down.

Another object of the invention is to provide for the admission of the liquid to be mixed and/or blended with the primary substance centrally through the hollow shaft of the rotating stirring member.

A further object of the invention is to provide a device for stopping automatically both the admission of the liquid and the mechanical function of the apparatus after the cycle of operation has been terminated.

Various further and more specific purposes, features and advantages will clearly appear from the detailed description given below taken in connection with the accompanying drawings which form part of this specification and illustrate merely by way of example embodiments of the devices of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings, in which FIG. 1 shows a partly sectioned side elevation of the apparatus;

FIG. 2 shows a front view of the operating mechanism of the apparatus, viewed in the direction of the arrow 2—2, partly broken away;

FIG. 3 is a detail section of a part of the mechanism, taken along the line 3—3 in FIG. 1, partly broken away;

FIG. 4 is a detail section of a part of the drive mechanism, taken along the line 4—4 in FIG. 1, partly broken away, FIG. 5 is an axial section of the lower end of the hollow stirring wheel shaft, taken along the line 5—5 in FIG. 1, partly broken off;

FIG. 6 is a cross-section of the lower end of the hollow stirring wheel shaft (taken without the container being inserted).

FIG. 9 is a horizontal section of the apparatus shown in FIGS. 7 and 8;

FIG. 10 is a side view of the apparatus shown in FIGS. 7 and 8;

FIG. 11 is a vertical section of the mixing bottle shown in the side view in FIG. 10;

FIG. 12 is an enlarged section of a longitudinal section of the actuating crank arm for the movement of the pumping bellows.

DESCRIPTION OF THE PREFERRED EMBODIMENTS

Figure 7:
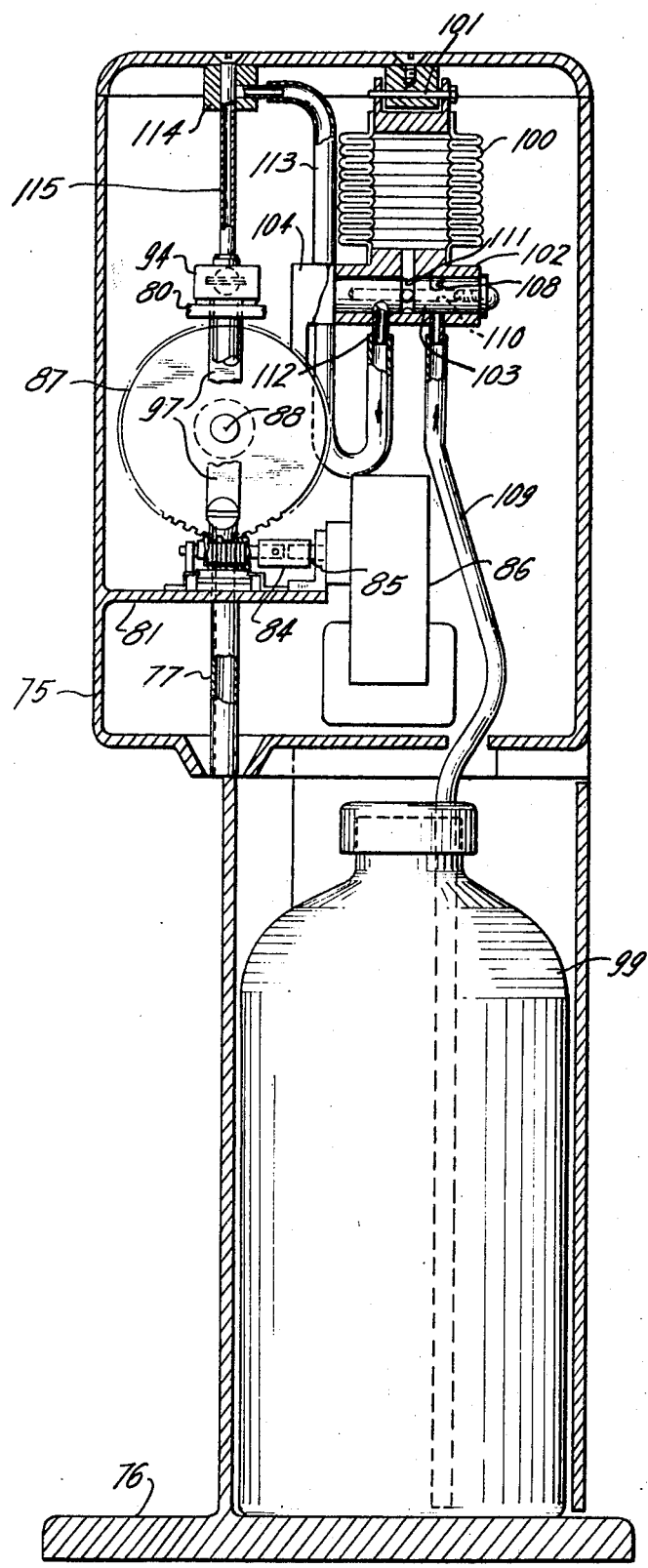
FIG. 7 is a vertical section of another embodiment of the invention, taken along the line 7—7 in FIG. 9.

Referring now in more detail to the drawings illustrating one of the embodiments (FIGS. 1–6) by which the invention may be realized, there is disclosed in FIG. 1 a support structure 11 having a base plate 12. A housing 13 is mounted on support 11. A vertical shaft 14 is rotatably held in housing 13 in brackets 15, 16 by a bearing bushing 17 in bracket 16 and by a bushing 18 in bracket 15. Shaft 14 consists of an inner hollow shaft 19 and an outer hollow shaft 20, whereby hollow shaft 19 is concentrically assembled in hollow shaft 20 and is mounted therein by a sliding key 21 (FIG. 4) in such manner that it is axially slidable in shaft 20 while it is rotated by the latter. A worm wheel 22 is secured on shaft 20 by a key 23 (FIG. 4). Worm wheel 22 is drivingly engaged by a worm 24 which is fastened on the shaft of an electric motor 25. Furthermore, a bevel gear 26 is mounted on shaft 20. Bevel gear 26 drives a bevel gear 27 which is fastened on a short transverse shaft 28, (FIG. 2). A spur gear 20 is fastened on shaft 28 alongside bevel gear 27, and a further spur gear 30 on a small shaft 31 is engaged by gear 29. Shaft 31 carries a worm 32 driving a worm wheel 33 which serves as a timing wheel. At least one pin 34 is carried adjacent the periphery of worm wheel 33. A microswitch 35 is mounted in such proximity that pin 34 can strike and operate the microswitch. 29 is the timer drive gear, 30 the timer driven gear and 35 the timer switch.

Inner hollow shaft 19 has attached on the upper end thereof a grooved wheel 36. A yoke 37 is fastened on a transverse shaft 38, and rollers 44, 44' are arranged at the ends of the branches of yoke 37 in such manner that they engage freely rolling the groove of wheel 36. Shaft 38 has furthermore a lever arm 39 attached thereto. Lever arm 39 is articulatedly connected to a connecting link 41 which is also linked to a pin 42 on a disc 43, which is attached to shaft 28. Pin 42 is attached to disc 43 at a certain radius, so that the system composed of disc 43, connecting link 41 and lever-arm 39 functions as linkage means for converting the rotational movement of disc 43 into a reciprocally swinging movement of lever arm 39. This swinging movement is then transferred by way of yoke 37 and rollers 44, 44' engaging grooved wheel 36 to inner shaft 19, resulting in a reciprocating vertical movement of the latter.

A tube 45 is inserted in the upper end of hollow inner shaft 19, and is stationarily held in a bracket 46. The upper end of tube 45 is secured to a solenoid valve 47 by which a liquid, for example, water is admitted into hallow inner shaft 19.

A lever arm 40 is freely swingably mounted on shaft 38. Lever 40 carries a microswitch 48. An adjustable pin 49 is attached to lever arm 39 in such manner that it will strike and operate microswitch 48. A tension spring 50 is hooked on the end of lever 40, so that the latter will be held with microswitch 48 against pin 49. Lever 40 has a latch hook 51 on its upper side. A pawl 52 is pivotally mounted on a stud 53 in such manner that it will engage and latch hook 51 when lever arm 40 is moved upwardly by lever arm 39 and the engagement of pin 49 with microswitch 48. A connecting rod 54 is attached to pawl 52 connecting the latter with a solenoid 55. A tension spring 56 is also attached to pawl 52, pulling it into the latching position when solenoid 55 is not energized.

At the lower end of hollow inner shaft 19 is a flexible, hollow shaft 57 removably attached by a screw nut 58. Flexible shaft 57 has two flexible mixing propeller blades 60 at the lower end thereof. Shaft 57 with blades 60 can be easily inserted into a mixing container 61 which can be secured in place on base plate 12 by a latch 62.

The apparatus is operated in the following manner: A weighed quantity of a suitable powdery material is put into container 61 which is then placed on base plate 12. Mixing blades 60 and flexible shaft 57 are inserted into container 61 and is attached by screw nut 58 to shaft 19. Motor 25 is energized by turning on switch 63. Shafts 19 and 20 are now rotated, and by way of the four bar-linkage means 43, 42, 41, 39, yoke 37 and wheel 36, inner hollow shaft 19 is moved up and down. Thereby the mixing action in container 61 is a very effectful one by means of the rotating and reciprocating actions. When lever arm 39 is moved upwardly by the linkage means, it carries lever arm 40 with it until latch hook 51 is engaged by pawl 52. When lever arm 39 swings downward, microswitch 48 becomes free and causes solenoid valve 47 to open, admitting mixing liquid through hollow shaft 19 to container 61. The mixing cycle continues until pin 34 of worm wheel 33 strikes microswitch 35 causing de-energization of motor 25 and solenoid 55, whereby pawl 52 is disengaged from latch hook 51 by spring 56. Spring 50 now pulls lever arm 40 downward whereby microswitch 48 is operated by contacting pin 49. Solenoid valve 47 is caused by microswitch 48 to close. The cycle of operation is thereby completed and a new cycle may be started.

Figure 8:
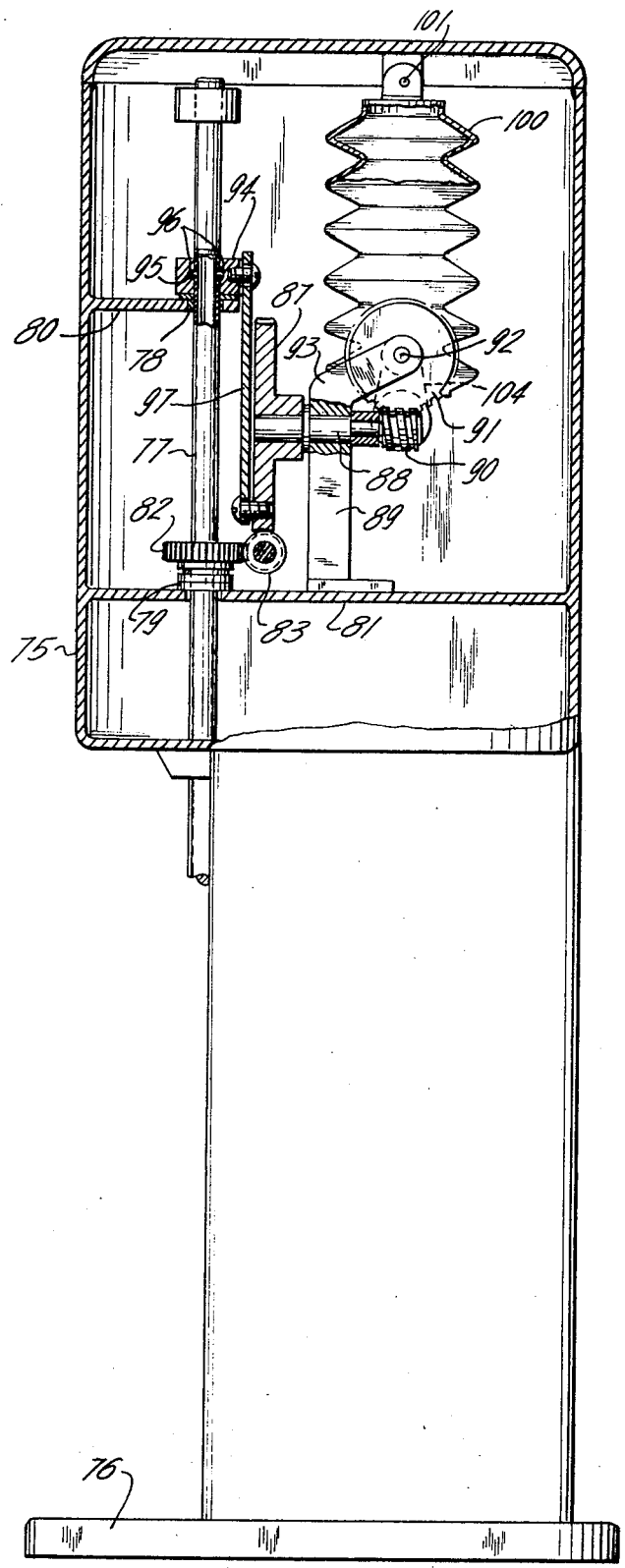
FIG. 8 is a vertical section of the apparatus shown in FIG. 7, taken along the line 8—8 in FIG. 9.

Another embodiment of the invention which is more suitable for a self-contained operation, is shown in FIGS. 7 to 12. A support structure 75 is arranged on a base plate 76. A hollow vertical shaft 77 is rotatably held in bushings 78 and 79 which are supported by brackets 80 and 81 of structure 75, a worm wheel 82 is mounted on shaft 77, being driven by a worm 83 which is coupled by a coupling 84 with the shaft 85 of an electric motor 86. A further worm wheel 87 is driven by worm 83. Worm wheel 87 is mounted on a horizontal shaft 88 which is journalled in a bracket 89. Shaft 88 carries also a worm 90 which drives a worm wheel 91 mounted on a shaft 92. Shaft 92 is rotatably held in bracket 89 which has a forked upper extension 93 for this purpose. A collar 94 is mounted on vertical shaft 77 and is held freely rotatably thereon by tangential pins 95 engaging in a groove 96 of shaft 77. A link-arm 97 is articulatedly attached with one end thereof at a certain radius on worm wheel 87 whereas the other end of link-arm 97 is articulatedly attached to collar 94. Thus, when worm wheel 87 is rotating, hollow shaft 77 is moved up and down while it is rotating about its own vertical axis.

In order to feed a liquid, for example water, through hollow shaft 77 into the mixing container 98 from a bottle 99 which is placed on base plate 76, a pump is arranged in structure 75 instead of a solenoid valve and an outside water pipe line. The pump consists of a bellows 100 made of a liquid-proof flexible material such as rubber or suitable plastic material. Bellows 100 freely swings on a hinge suspension 101 and carries on its lower end a valve body 102 in which a rotatable valve 103 is located. Both bellows 100 and valve 103 are operated by a crank arm 104, shown in detail in FIG. 12. One end of arm 104 is fixed on valve 103 while the other end is held on shaft 92 by a cam-like end 105 and a pin 106 which engages cam 105 under the force of a spring 107. When arm 104 is rotated by shaft 92, bellows 100 is extended and compressed while it can freely swing sideways on hinge suspension 101. At the same time valve 103 is rotated, and during the extension period of bellows 100 opens suction part 108 so that liquid from bottle 99 can be sucked through a flexible hose 109 and through inner bore 110 and ring-shaped center communication 111 into bellows 100. When bellows 100 is subsequently compressed, suction part 108 is closed by the continued rotation of valve 103 and discharge part 112 is opened, so that the liquid is now fed through hose line 113 and a fixed head 114 and vertical pipe 115 into hollow shaft 77. Vertical tube 115 is slidingly fitted into hollow shaft 77.

A screw lid 116 is fitted on container 98 and a propeller shaft 117 is rotatably held in lid 116. Shaft 117 is hollow and carries on the lower end thereof a mixing propeller 118 which may have any suitable shape, and on the upper end an elastic coupling piece 119 which fits liquid-proof over the lower end of shaft 77. A compression spring 120 is arranged on base plate 76 for holding container 98 in an upper position during the mixing operation. A manually operated switch 121 for switching electric motor 86 on and off is arranged in base plate 76.

While the invention has been described and illustrated with respect to certain preferred examples which give satisfactory results, it will be understood by those skilled in the art after understanding the principle of the invention, that various changes and modifications may be made without departing from the spirit and scope of the invention.

What is claimed is:

1. A mixing device for preparing of mixtures and blends of powdery material with liquids in a container, comprising a substantially vertical hollow rotatable shaft, means for driving said shaft, first means driven by said shaft for reciprocatingly moving said shaft upwardly and downwardly during the rotation thereof, means for periodically admitting a liquid through said hollow shaft into said container, and a tubular member at the end of said shaft, said member being extendable into said container and having mixing means at the lower end thereof.

2. A mixing device according to claim 1, said driving means comprising a motor, and said tubular member being flexible and detachable.

3. A mixing device according to claim 1, said mixing means comprising at least one flexible blade.

4. A mixing device according to claim 3, said device having a support structure and a base plate for said structure.

5. A mixing device according to claim 3, said first means comprising linkage means and a yoke having rollers, and a grooved wheel on said vertical shaft, said rollers engaging said wheel.

6. A mixing device according to claim 1, and second means driven by said shaft for controlling the timing of the operation of said device.

7. A mixing device according to claim 1, said first means comprising linkage means and a yoke having rollers, and a grooved wheel on said vertical shaft, said rollers engaging said wheel.

8. A mixing device according to claim 7, said liquid admitting means comprising a solenoid valve and a control switch for said valve, said switch being mechanically operated by said linkage means.

9. A mixing device according to claim 8, and second means driven by said shaft for controlling the timing of the operation of said device.

10. A mixing device according to claim 9, said second means comprising a timing wheel and at least one striker pin thereon, and a microswitch operated by said pin, said microswitch controlling said driving means.

11. A mixing device according to claim 1, second means driven by said shaft for controlling the timing of the operation of said device, said first means comprising linkage means and a yoke having rollers, and a grooved wheel on said vertical shaft, said rollers engaging said wheel.

12. A mixing device according to claim 11, said mixing means comprising at least one flexible blade.

13. A mixing device according to claim 1, said liquid admitting means comprising pumping means, valve means on said pumping means, and drive means for operating said pumping and said valve means, said drive means being operatively connected with said first means driving said hollow shaft.

14. A mixing device according to claim 13, and further comprising a receptacle for holding a liquid and conduit means for said liquid connecting said valve means with said receptacle and with said vertical hollow shaft.

15. A mixing device according to claim 13, said pumping means comprising bellow means.

References Cited

UNITED STATES PATENTS

| | | | |
|---|---|---|---|
| 2,651,343 | 9/1953 | Alexander | 259—19 X |
| 3,073,577 | 1/1963 | Stevenson | 259—37 |
| 3,074,786 | 1/1963 | Duthie | 259—27 X |

ROBERT W. JENKINS, Primary Examiner